United States Patent [19]

Nannini

[11] 4,386,832

[45] Jun. 7, 1983

[54] ADJUSTABLE LUMINOUS INTENSITY SUN GLASSES

[76] Inventor: Giorgio Nannini, Via Grandi 153, Modena, Italy

[21] Appl. No.: 285,764

[22] Filed: Jul. 22, 1981

Related U.S. Application Data

[63] Continuation of Ser. No. 53,848, Jul. 2, 1979, abandoned.

[30] Foreign Application Priority Data

Sep. 1, 1978 [IT] Italy .................................. 289898/78

[51] Int. Cl.³ .......................... B02C 7/12; G02C 1/00; G02C 5/02
[52] U.S. Cl. ........................................ 351/49; 351/86; 351/131
[58] Field of Search ................... 351/49, 131, 86, 140, 351/126; 350/409; 2/432

[56] References Cited

U.S. PATENT DOCUMENTS

| | | | |
|---|---|---|---|
| 2,005,426 | 6/1935 | Land | 351/49 |
| 2,251,330 | 8/1941 | Fairbank | 351/49 |
| 3,944,346 | 3/1976 | Shindler | 351/49 |
| 4,102,566 | 7/1978 | Shelton | 351/131 |
| 4,119,369 | 10/1978 | Eloranta | 351/49 |
| 4,196,982 | 4/1980 | Watkins | 351/86 |

Primary Examiner—John K. Corbin
Assistant Examiner—Rodney B. Bovernick
Attorney, Agent, or Firm—Cushman, Darby & Cushman

[57] ABSTRACT

The subject of the invention is represented by adjustable luminous intensity sun glasses of the type employing two pairs of polarizing lenses set before one another one pair of which is made up of two identical mobile synchronically rotating lenses which rotate on their axes in respect of the other pair whose lenses are fixed.

The two fixed lenses are assembled onto an external frame component, equipped with stems and especially designed dap components relative to the internal side; the set may be adopted as a normal pair of glasses with polarizing lenses. The two mobile lenses are assembled—with the possibility of synchronous rotation around their axes—onto an inside frame component which is equipped with dap seats.

The assembly and disassembly of the two components, the inside and the outside ones, in order to form a single slender frame are achieved thanks to the elastic deformability of the components themselves which, once they have been approached to each other, are bent so as to allow the coupling of said dap components with the corresponding dap seats.

5 Claims, 11 Drawing Figures

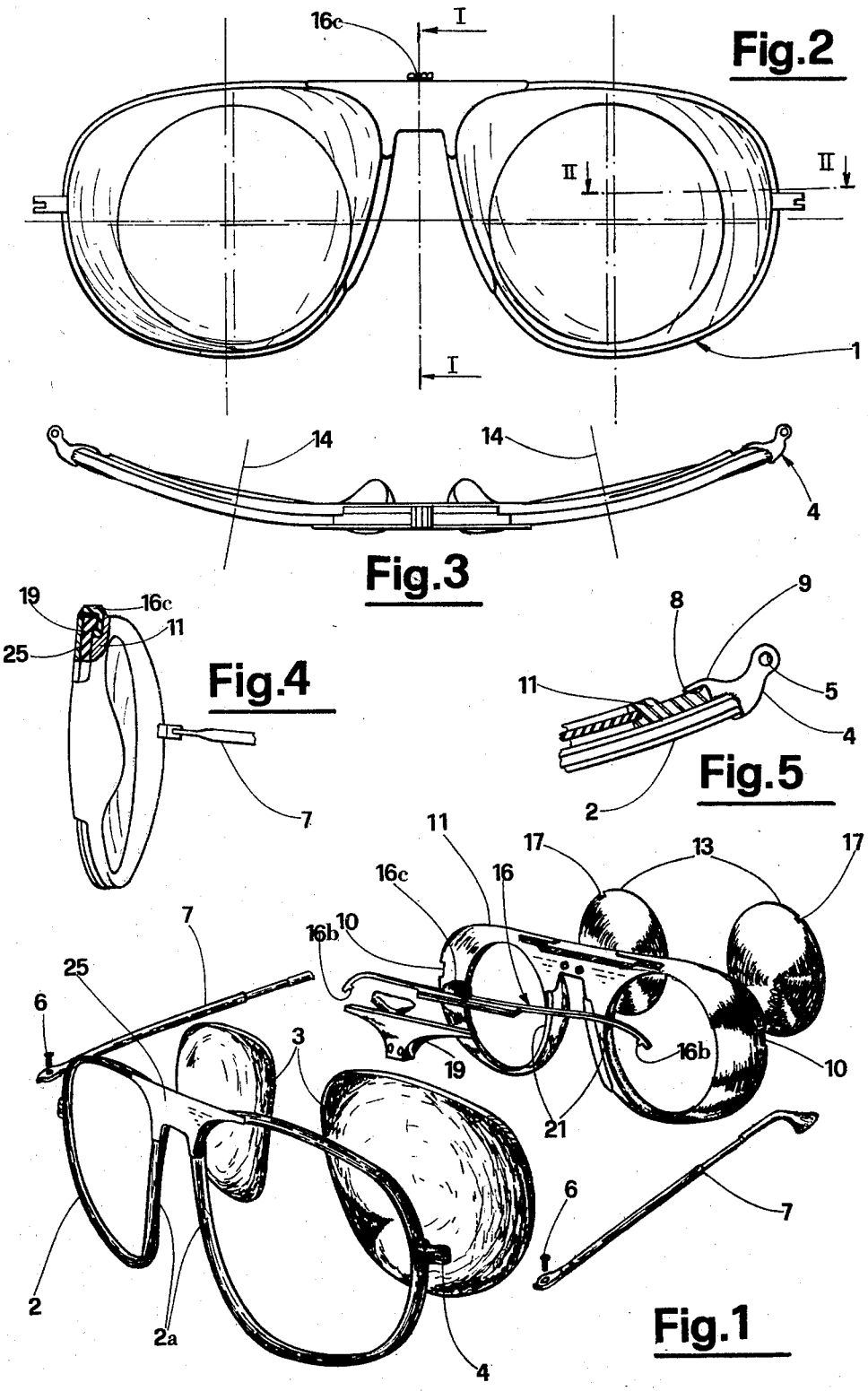

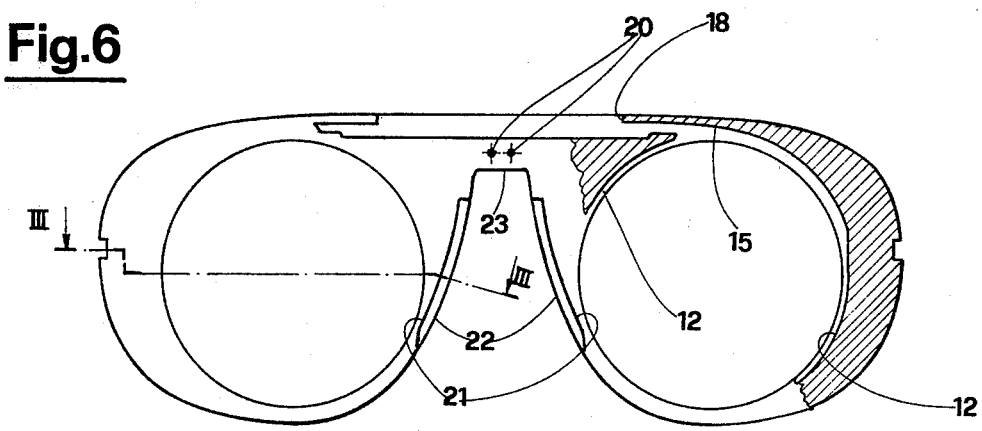
Fig.6
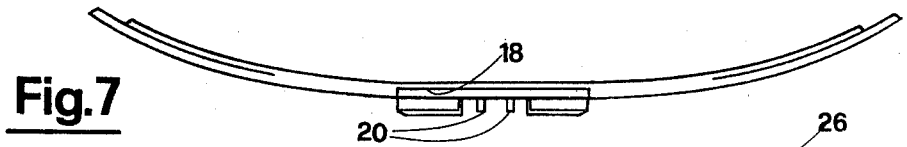
Fig.7
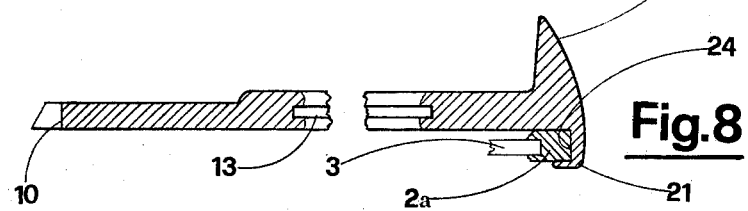
Fig.8
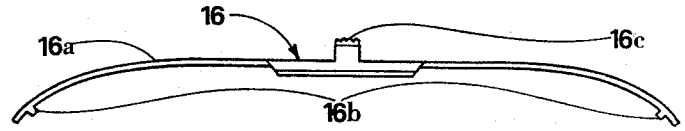
Fig.9
Fig.10
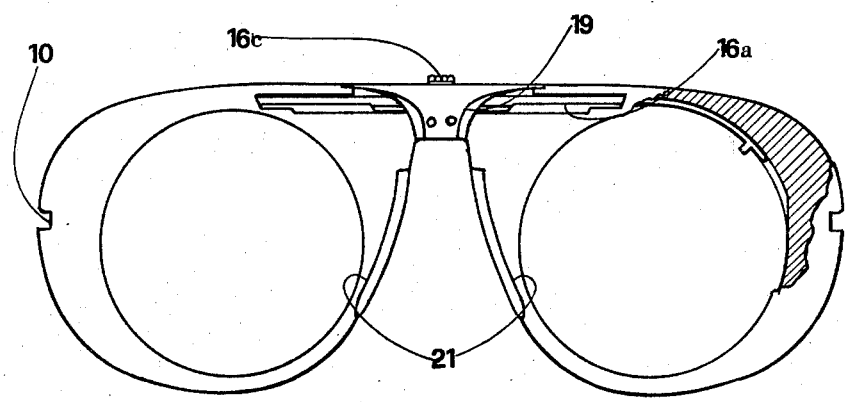
Fig.11

ADJUSTABLE LUMINOUS INTENSITY SUN GLASSES

This is a continuation of application Ser. No. 53,848 filed July 2, 1979 now abandoned.

This invention relates to adjustable luminous intensity sun glasses.

Known realizations include adjustable intensity sun glasses which make use of two pairs of polarizing lenses arranged one before the other, one pair of which is made up of two similar mobile lenses rotating on their axes in respect of the other pair the lenses of which are fixed.

Such realizations, however, are usually rather heavy and bulky and hence rather uncomfortable and not very satisfactory from the aesthetic point of view.

Furthermore, usually, due to the their structural characteristics and assembly requirements, the above realizations present some difficulties in respect of accessibility (e.g. cleaning) to the mutually opposed walls of the lenses which are arranged before one another.

The object of this invention is to find a solution for the aforementioned defects through the realization of adjustable luminous intensity sun glasses characterized by the fact that, thanks to their overall dimensions and structural shape, they are as easy to use as common sun glasses.

A further object of this invention is to achieve adjustable luminous intensity sun glasses capable of rapid and simple assembly and disassembly of the mobile lenses, together with the relative accessories, of the frame.

An advantage of this invention is represented by the possibility of producing, after the simple dissassembly of the mobile lenses and of the relative fittings of the frame, a normal pair of sun glasses with polarizing lenses.

The above as well as some further advantages are obtained by this invention which relates to adjustable luminous intensity sun glasses of the type employing two pairs of polarizing lenses arranged one before the other one of which is fixed to a supporting structure or frame, while the other pair is made up of two mobile lenses capable of rotation on their axes in respect of the lenses of the fixed pair, comprising a manually operated device for the control of the synchronous and unidirectional rotation (adjustable up to an amplitude of about 90°) of both the aforementioned mobile lenses, characterized by the fact that they comprise:—an external (supporting) unit of the frame, to which a pair of polarizing lenses is fitted, bearing the supports for connection to the stems and equipped with restrained fitting components arranged symmetrically at least in respect of their side edges;—an internal unit of the frame equipped with guide seats capable of lodging a pair of mobile rotational lenses as well as the relative rotational control unit and bearing, in symmetrical arrangement at least relative to their lateral edges, some dap seats capable of coupling with the aforementioned dap components so as to make the above external unit integral; the mutual coupling being made possible by the elastic deformability of at least one of said components of the frame in respect of the natural non-deformed configuration at rest of said components or of the dap seats.

Further features and advantages of this invention will appear more clearly in the course of the detailed description which follows of a preferred embodiment which is illustrated purely by way of example in the enclosed drawings where:

FIG. 1 is an exploded perspective view of the invention under discussion;

FIG. 2 is a vertical elevation front view of the invention under discussion;

FIG. 3 is a plan view of FIG. 2

FIG. 4 shows a section according to path I—I of FIG. 2;

FIG. 5 is a partial cutaway view, on an enlarged scale, according to path II—II of a part of FIG. 2;

FIG. 6 is a partially sectioned front elevation of a detail of the invention under discussion;

FIG. 7 shows, in the same scale, a plan top view of the detail of FIG. 6;

FIG. 8 shows—in enlarged scale—a section executed according to paths III—III referred to in FIG. 6;

FIG. 9 shows, in the same scale as FIG. 6, a front view of another detail of the invention under discussion;

FIG. 10 shows a top view of FIG. 9 in the same scale;

FIG. 11 is a partially cutaway front view of a set of mutually assembled particulars.

With reference to the abovementioned figures, (1) has been adopted to designate a supporting structure or frame in its entirety. (2) has been employed to indicate an external (supporting) component of the frame (1), which is symmetrical in respect of path I—I, metal made, to which a pair of polarizing lenses (3) has been fitted. Two identical supports (4)—fixed symmetrically relative to the external edges of the component (2), present some holes (5) for hinging, by means of threaded pins (6), with stems (7).

Some dap components (8) are provided at the level of the inside face of the lateral edges of the above component and are arranged symmetrically and are part of the support (4). The dap components (8) are made up of appendixes of said supports which extend, for limited length, symmetrically toward the inside (concave) side of the component (2) so as to point out some dap hollows (9) capable of lodging the relative dap seats (10) arranged symmetrically relative to the outside lateral edges of an internal component (11) of the frame (1). Said inside component (11) (symmetrical in respect of path I—I), is made of a single plastic material block or similar material and presents some (ring-shaped) guide seats (12) produced symmetrically which are capable of lodging, by sliding connection, a pair of circular polarizing lenses (13) capable of rotational motion on their axes (14). Furthermore, the inside component (11) bears a guide seat (15) designed to lodge and guide a control unit (16) of the rotation of the mobile polarizing lenses (13).

Said control unit comprises a thin bending arm (16a) which is symmetrical, with a prismatic section the overall length of which is greater than the distance between the axes (14) of the above lenses (13) so as to clasp at least partially the edges of the lenses (13) as may be seen by observing FIG. 11. The aforementioned control unit (16) is at both ends symmetrically equipped with some protruding teeth (16b) arranged for fitting into hollows (17) obtained at the level of the edges of the mobile polarizing lenses (13) so as to secure them mutually to the rotation which is therefore synchronous and unidirectional.

At the centre of the control unit (16) a little protruding maneuver lever (16c) is fixed, which can run along the whole length of a groove (18) produced in the top part of the inside component (11) and communicating directly with the guide seat (15). A shaped guide component (19), coupled with the inside component (11) by means of identical symmetrical pins (20) protruding frontally from the aforementioned component, acts as a lateral guide wall for the central part of the control unit (16) and for the small maneuver lever (16c) for the whole length of the groove (18).

Two protruding components (21) are fixed symmetrically in relation to two lengths (22) of the lateral edges symmetrically opposed and placed immediately under the small bridge (23) of the inside component (11).

The protruding components (21) extend toward the outside front side (convex) of the inside component (11) so as to define—parallelly to the the lengths of the opposed lateral edges (22)—two hollow dap seats (24) which are "C" sectioned and suitable for lodging the corresponding lengths (2a) of the lateral edges, symmetrically opposed, immediately below the little bridge (25) of the outside component (2). The protruding components (21) extend also along the inside (concave) of the internal component (11) thus producing two anatomical bearings (26) (nibs).

The coupling of the two components, the internal and the external ones, of the frame takes place very simply after having assembled separately the pair of polarizing lenses (3) and the stems (7) onto the outside component (2) as well as the pair of mobile polarizing lenses (13), the rotational control unit (16) and the shaped guide component (19) onto the inside component (11). In fact it is sufficient to attach the component (11) thus assembled to the inside (concave) side of the component (2), to fit the corresponding lengths (2a) of the lateral edges symmetrically facing the outside component (2) into the hollow dap seats (21) of the inside component (11) and to deform elastically the above components bending them so as to allow the connection of the dap components (8) with the relative dap seats (10).

The connection described above ensures, thanks to its features, perfect integrity between the aforementioned components making up the frame (1), and great ease in the disassembly and re-assembly processes which also allows the employment of the outside component (2), together with lenses and stems, as a normal pair of glasses equipped with polarizing glasses.

Obviously, several practico-applicational alterations may be introduced to the invention in respect of structural details, without thus exceeding the protectional field of the inventive concept, as claimed hereunder.

I claim:

1. In adjustable luminous intensity sun glasses of the type having a frame provided with a bridge portion connecting right and left frame sections each supporting a pair of polarizing lenses with the front lens of each pair being fixed and the rear lens being rotatable, and rearwardly extending temple pieces, the improvement comprising:

an elastic front frame component having a bridge portion connecting right and left sections each supporting a fixed polarizing lens and having a tab on its lateral outer side provided with a dap-seat engaging portion and a portion extending inwardly toward said bridge portion in spaced relation to the rear side of the corresponding section, said front frame component normally being forwardly convex and rearwardly concave in plan view;

an elastic rear frame component having a bridge portion connecting right and left sections each rotatably supporting a polarizing lens, said rear frame component being adapted normally to seat closely against said front frame component, said rear frame component having dap seats on its lateral edges to receive said dap-seat engaging portions of said tabs with said inwardly extending portions of said tabs in overlying engagement with said rear frame component sections to secure said front and rear components together, whereby said elastic frame components may be deformed to flatten their concavo-convex configuration sufficiently to disengage said dap-seat engaging tab portions from said dap seats and permit said components to be detached from one another by relative sliding movement therebetween.

2. The structure defined in claim 1 including bearing supports for the temple pieces on the lateral edges of the front frame component and wherein tabs on said front frame component are integral with said bearing supports.

3. The structure defined in claim 2 wherein the front frame component is made of metal with the bearing supports being integral therewith, and the rear frame component is made of plastic material.

4. The structure defined in claim 1 including a manually operable control unit for simultaneously adjusting the angular position of both of the rotatable lenses comprising:

a thin strip of flexible material slidable in a guide seat extending laterally across a top portion of the rear frame component, the length of said strip being greater than the distance between the axes of said rotatable lenses;

a tooth extending from each end of said strip into engagement in an edge notch in a corresponding rotatable lens; and an operating knob protruding upwardly from said strip through a slot in said rear component for adjusting said angular position.

5. The structure defined in claim 1 wherein the rear frame component is provided with laterally-spaced downwardly-diverging nose-engaging portions protruding forwardly from the inner edges of the right and left sections of said rear component, said protruding portions each being provided on its lateral outer side with a channel adapted to receive a complementary portion of the corresponding section of the forward frame component to detachably secure said components together along said nose-engaging portions.

* * * * *